United States Patent
Becker et al.

(10) Patent No.: US 7,235,030 B2
(45) Date of Patent: Jun. 26, 2007

(54) STEP DOWN GEAR TRAIN FOR AN ADJUSTING DEVICE OF AN AUTOMOTIVE VEHICLE SEAT

(75) Inventors: Burckhard Becker, Solingen (DE); Van-Toan Ho, Solingen (DE); Ulrich Karthaus, Remscheid (DE); Wilfried Beneker, Leichlingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 288 days.

(21) Appl. No.: 10/999,072

(22) Filed: Nov. 29, 2004

(65) Prior Publication Data
US 2005/0119085 A1  Jun. 2, 2005

(30) Foreign Application Priority Data
Nov. 28, 2003  (DE) ................................ 103 56 295

(51) Int. Cl.
*F16H 1/32* (2006.01)
(52) U.S. Cl. ...................................... 475/177; 297/362
(58) Field of Classification Search ............... 475/162, 475/176, 177; 297/362
See application file for complete search history.

(56) References Cited

U.S. PATENT DOCUMENTS

| 4,469,375 A | * | 9/1984 | Boyer ......................... 297/362 |
| 4,884,844 A | * | 12/1989 | Kershaw et al. ............ 297/362 |
| 5,820,504 A | * | 10/1998 | Geralde ....................... 475/177 |
| 6,543,850 B1 | | 4/2003 | Becker et al. |

FOREIGN PATENT DOCUMENTS

EP  211687 A1 * 2/1987

* cited by examiner

*Primary Examiner*—Richard M. Lorence
*Assistant Examiner*—Edwin A. Young
(74) *Attorney, Agent, or Firm*—Cantor Colburn LLP

(57) ABSTRACT

A gear train is provided including an output shaft rotatable about an output axis, a housing rotatable relative to the shaft, a toothed washer having a circumferential first toothed surface, an eccentric that is rotatably disposed on the shaft and has an eccentric driving surface offset relative to the axis by an eccentricity, the eccentric comprising a driving region, an annular gear comprising a circumferential second toothed surface, a circumferential third toothed surface and an eccentric driven surface cooperating with the driving surface, a gearwheel comprising a circumferential fourth toothed surface, the first toothed surface of the washer and the second toothed surface of the annular gear meshing together in a first angular position and forming a first nutating gear having the eccentricity and the third toothed surface of the annular gear and the fourth toothed surface of the gearwheel meshing together in a second angular position.

15 Claims, 4 Drawing Sheets

STEP DOWN GEAR TRAIN FOR AN ADJUSTING DEVICE OF AN AUTOMOTIVE VEHICLE SEAT

TECHNICAL FIELD OF THE INVENTION

The invention relates to a step down gear train that is particularly suited for use in an adjusting device of an automotive vehicle seat. As is well known, it has an output shaft which rotates about an output axis. A housing accommodates the various gear parts, the output shaft is rotatable relative to the housing. Two eccentric gear stages are provided, a first eccentric gear stage having a toothed washer with circumferential teeth meshing with the teeth of an annular gear. A second eccentric gear stage is formed by the annular gear and by a gearwheel comprising circumferential teeth. The annular gear is provided with an eccentric driven surface that cooperates with a mating driving surface. The two nutating gear stages have the same eccentricity e.

BRIEF DISCUSSION OF RELATED ART

Such type step down gear trains are widely used in adjusting devices for automotive vehicle seats. They have proved efficient. They have a quite high gear reduction ratio, which is particularly advantageous for step down gear trains that are driven by means of an electric motor. The reader is referred to U.S. Pat. No. 6,543,850 B1 for an example of prior art.

A problem with step down gear trains of this type is to achieve manufacturing accuracy and zero clearance. Step down gear trains are often utilized for adjusting devices in which minimal clearance is to be provided in spite of the longer lever arms formed by the one and/or the other of the parts to be adjusted. An adjusting device for the inclination of the backrest will be taken as an example. Here, the backrest forms a quite long lever. An adjusting device disposed in the region of the axis of the backrest should have no play that could be noticed at the upper edge of the backrest.

Another problem lies in providing proper meshing of the teeth of the two nutating gear stages. According to prior art, the annular gear has common teeth that mesh with both the toothed washer and the gearwheel. The result thereof however is that the teeth of the paired teeth of at least one of the two nutating gear stages cannot be configured optimally.

BRIEF SUMMARY OF THE INVENTION

In view thereof, the invention provides a step down gear train that allows an optimal geometry of the teeth to be achieved and that preferably has a low overall height in the axial direction.

The two nutating gear stages engage in angular positions that are offset by 180 degrees. This permits to keep low the tilt moments exerted by each nutating gear stage onto the output axis, in the best case to even reduce them to almost zero.

The two nutating gear stages may each be optimally adapted to each other. As opposed to prior art, the first toothed surface of the toothed washer can be formed to accurately mate the second toothed surface of the annular gear without having to take the other toothed surfaces into consideration. The same applies to the third toothed surface of the annular gear and to the fourth toothed surface, which again may be made so as to optimally match together without having to take the other toothed surfaces into consideration. As a result, the two nutating gear stages can be configured optimally with regard to their meshing features.

In a preferred developed implementation, the second toothed surface and the third toothed surface of the annular gear are of a different type with the second toothed surface being an externally-toothed surface and the third toothed surface an internally-toothed surface or conversely, the second toothed surface being an internally-toothed surface and the third toothed surface an externally-toothed surface. This configuration permits to arrange all the toothed surfaces in one radial plane. The resulting overall height is low and the tilt forces exerted onto the output shaft are small.

In order to achieve the highest possible gear reduction ratio, the difference in the number of teeth between the first toothed surface and the fourth toothed surface should advantageously be as small as possible. It has proved particularly advantageous to configure a nutating gear stage in such a manner that the two toothed surfaces involved have the same number of teeth. In this case, this gear stage does not participate in reducing the gear, it merely has an anti-nutating effect, meaning it accommodates the wobbling motion of the other nutating gear stage. Gear reduction is achieved with only the other nutating gear stage, which is configured accordingly. Advantageously, the number of teeth differs by one tooth between the two toothed surfaces.

In a preferred developed implementation, the housing has a housing part and the toothed washer or the gearwheel is integrally connected to said housing part or is formed by said housing part. This permits to economize on a separate component part and the gear train is of short construction in the axial direction.

A more advantageous implementation is achieved if the two toothed surfaces of the annular gear have the smallest possible tooth difference, more specifically only a one-tooth difference and preferably no tooth difference at all. This makes it possible to configure the annular gear in such a manner that at each tooth the wall thickness of the annular gear is substantially the same as that of any other randomly chosen tooth. Accordingly, the annular gear has a stability that does not substantially vary with the angle of rotation.

In another preferred embodiment, the output shaft has a pinion that is connected thereto. In practical use, said pinion engages one of the two parts of the automotive vehicle seat that are to be adjusted relative to each other.

In another improvement, there is provided a driver member that is connected to the output shaft. The gearwheel has a driver surface for cooperation with said driver member and for providing a non-rotatable, releasable connection between the driver member and the gearwheel. This permits easy mounting of the gear train. It is advantageous to combine the driver member with the pinion, for example to form the driver member in an end region of the pinion.

BRIEF DESCRIPTION OF THE DRAWINGS

Other features and advantages will become more apparent upon reviewing the appended claims and the following non restrictive description of embodiments of the invention, given by way of example only with reference to the drawing. In said drawing:

DETAILED DESCRIPTION OF THE INVENTION

Herein after, the first embodiment as shown in the FIGS. 1 through 4 will be first described. The explanations given in this context however also apply to the other exemplary embodiments so that the other exemplary embodiments are not further described except insofar as they differ from the first exemplary embodiment.

Figure 4:
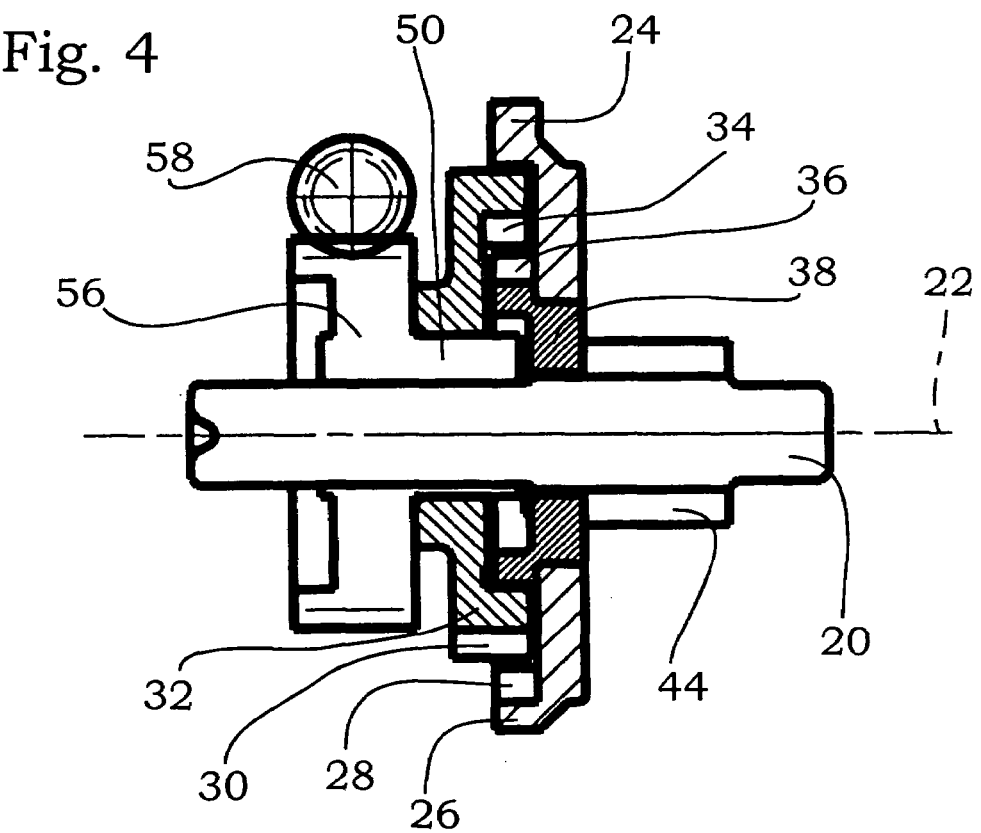

The step down gear train has an output shaft 20 that extends through the entire gear train, as best shown in FIG. 4. It serves to carry several component parts. It rotates about an output axis 22. There is further provided a housing, with only one housing part 24 being shown in the respective one of the FIGS. The output shaft 20 rotates relative to said housing part 24, the output axis 22 is stationary relative to the housing part 24. A toothed washer 26 is configured integral with said housing part 24, it has a circumferential internally-toothed surface, the toothed surface of the toothed washer 26 will be referred to as first toothed surface 28 herein after. The housing part 24 is a substantially flat component part, it can be manufactured by an embossing or a stamping technique or by any other suited process. The first toothed surface 28 is pressed, stamped or manufactured in another way from the material of the housing part 24.

A second toothed surface 30, which is implemented as an externally-toothed surface, meshes with the toothed washer 26. It is formed on an annular gear 32 which has still another toothed surface, namely the third toothed surface 34. The first toothed surface 28 and the second toothed surface 30 form a first nutating gear stage or an eccentric gear. As is well known, a nutating gear stage consists of two toothed surfaces, an internally-toothed surface and an externally-toothed surface. On the externally-toothed surface, the tips of the teeth lie on a circle that is smaller by at least one tooth height than the circle on which lie the tips of the teeth of the internally-toothed surface. The centers of the two toothed surfaces 28, 30 are offset by an offset dimension or eccentricity e.

Figure 1:
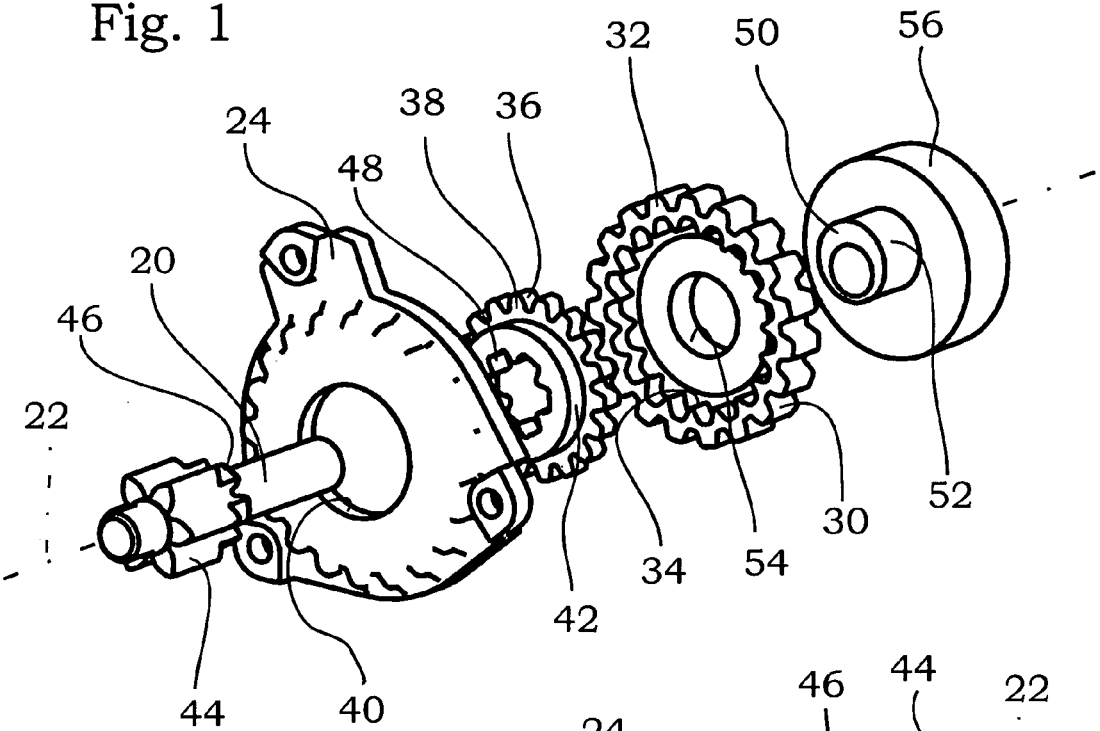
FIG. 1: is a perspective illustration in the form of an assembly drawing showing a first embodiment, a pinion being shown at the front.
Figure 2:
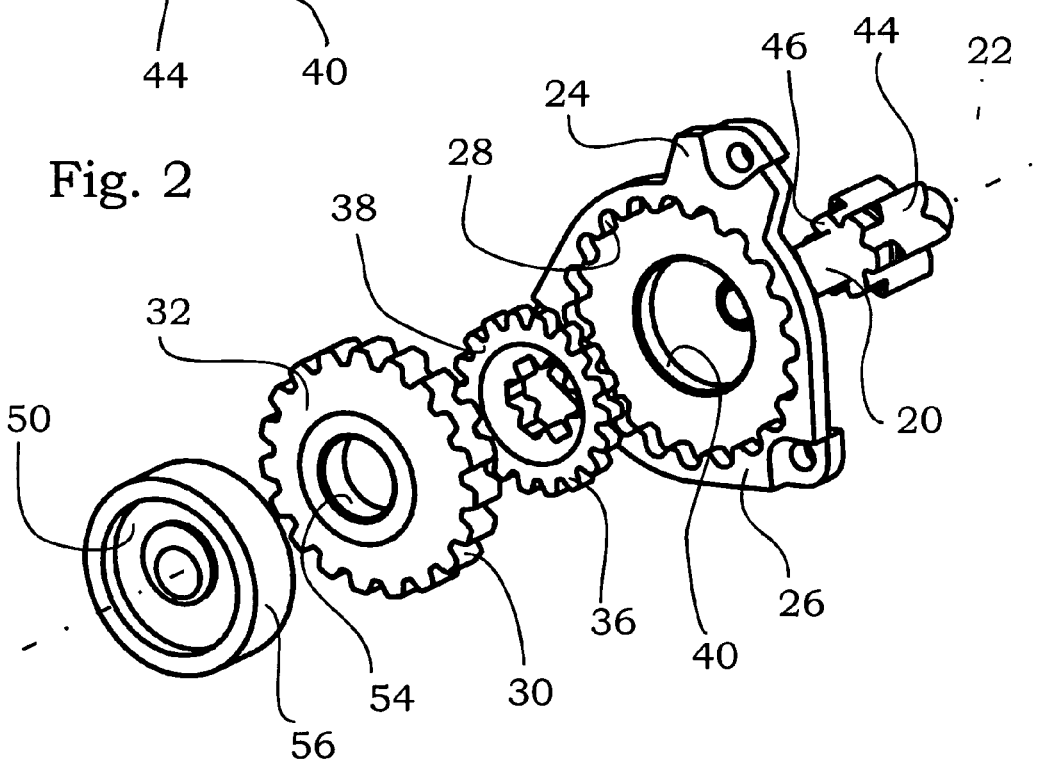
FIG. 2: is an illustration like FIG. 1, but now turned into another viewing direction, the pinion is now at the back.
Figure 3:
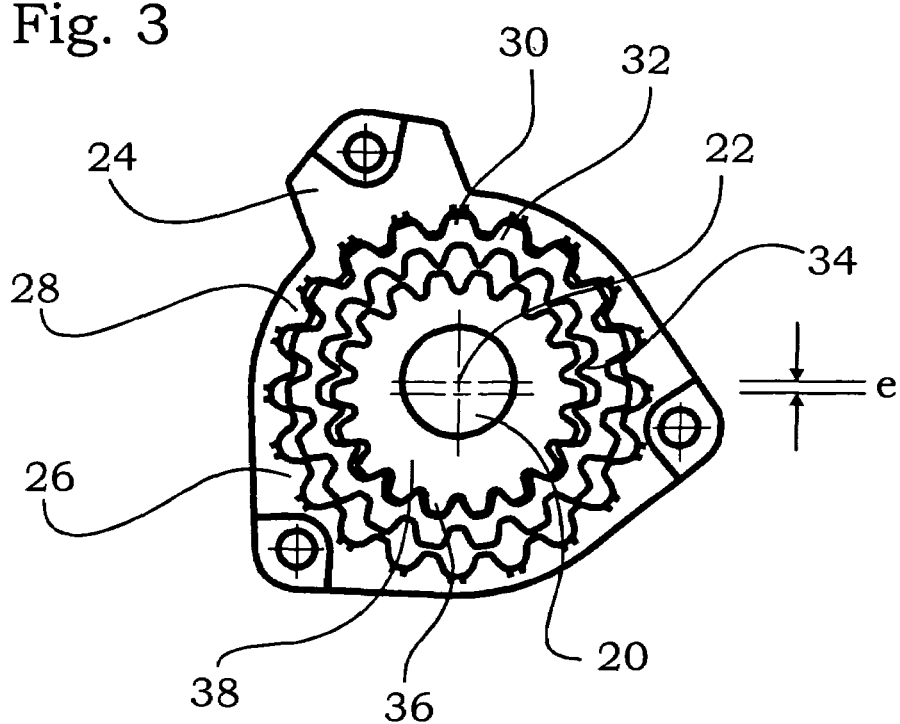
FIG. 3: is a top view of an assembled gear train, but without a worm wheel, the viewing direction being similar to that in FIG. 2, FIG. 4: is an axial sectional view of the assembled gear train.

The two toothed surfaces 28, 30 are formed to accurately mate and preferably have involute form gear teeth. A fourth toothed surface 36 meshes with the third toothed surface 34 of the annular gear 32, it is formed as an externally toothed surface on a gearwheel 38. Said gearwheel 38 is located between the housing part 24 and the annular gear 32. The third toothed surface 34 and the fourth toothed surface 36 form a second nutating gear stage. The toothed surfaces of this second nutating gear stage are also optimally adapted to each other. The eccentricity e of this nutating gear stage equals the eccentricity of the first nutating gear stage. However, meshing of the toothed surfaces 28, 30 of the first nutating gear stage occurs, with respect to the output axis 22, offset by 180 degrees relative to the meshing of the second nutating gear stage consisting of the third toothed surface 34 and the fourth toothed surface 36. This is shown in FIG. 3. There, it can be seen that the first nutating gear stage meshes at the twelve o'clock position, whereas the second nutating gear stage meshes at the six o'clock position. As a result, the forces the two nutating gear stages exert onto the output shaft 20 are directed in opposing directions. Since the two toothed surfaces are located in the same plane, these forces almost counterbalance each other. Accordingly, the tilt load on the output shaft 20 is small.

With regard to the number of teeth of the two nutating gear stages, the following applies: in the exemplary embodiment shown, the toothed washer 26 has minus 20 teeth, minus designating the internally-toothed surface. The associated second toothed surface 30 has plus 19 teeth, with plus referring to the externally-toothed surface. The third toothed surface 34 formed on the same annular gear 32 has minus 19 teeth, the associated fourth toothed surface 36 has plus 18 teeth. Accordingly, the first toothed surface 28 and the fourth toothed surface 36 differ by two teeth.

It is particularly advantageous to configure one of the two nutating gear stages in such a manner that the two toothed surfaces of this nutating gear stage have the same effective number of teeth, meaning that they are composed of a gear pair minus 20 and plus 20. Such a nutating gear stage does not participate in reducing the gear, it merely serves to suppress the nutating motion. If such a nutating gear stage is provided, the other nutating stage must effect the transmission, it may then be configured in such a manner that the tooth difference is one. This permits to achieve the highest possible gear reduction ratio.

The housing part 24 has a bearing hole 40 that is centered on the output axis 22. A bearing shoulder 42 of the gearwheel 38 is formed so as to conform thereto. Thus, the gearwheel 38 is carried in the housing part 24 so as to be rotatable about the output axis 22. As shown in FIG. 4, the gearwheel 38 directly contacts the neighboring surface of the housing part 24 in the region of its fourth toothed surface 36. The tooth depth of all of the toothed surfaces 28, 30, 34, 36, as measured in the axial direction, is substantially the same. As a result, the gearwheel 38 is located within the recess formed by the first toothed surface 28 formed in housing part 24. The second toothed surface 30 and the third toothed surface 34 are also located in the region of said recess. All of the toothed surfaces 28, 30; 34, 36 lie in one plane.

The two toothed surfaces 30 and 34 of the annular gear 32 have the same number of teeth. As a result, the material thickness of the annular gear 32 as viewed in revolution only varies with the gear period and not additionally as this would be the case if the two toothed surfaces 30, 34 had differing numbers of teeth for example. In that these toothed surfaces 30, 34 have the same number of teeth, constant stability may be achieved for the annular gear 32 independent of the angle about the output axis 22.

A pinion 44 is connected fixedly to the output shaft 20. It protrudes on the side of the housing part 24 that opposes the toothed surfaces 28, 30; 32, 34 and that is located on the outside when assembly of the gear train is completed.

One end of the pinion 44, which is turned toward the toothed surfaces, is lathed or stepped in another way, thus forming a driver member 46. Said driver member can also be configured in another shape and otherwise connected to the output shaft 20. A driver surface 48 configured in the gearwheel 38 corresponds to the driver member 46. As the driver member 46 engages with the driver surface 48, the gearwheel 38 is non-rotatably linked to the output shaft 20 but is releasable in the axial direction.

The gear train has an eccentric 50 comprising an internal hole by which it is carried so as to be rotatable about the output axis 20. It has an eccentric driving surface 52 having the eccentricity e. The annular gear 32 has an accordingly configured eccentric driven surface 54 of an eccentricity e. Cooperation of the two surfaces 52, 54 effects nutating motion of the two nutating gear stages. When the eccentric 50 is rotated, the angular positions in which the respective ones of the gear stages are meshing, revolve. They always remain offset by 180 degrees. Starting for example from the position as shown in FIG. 3, revolution occurs upon rotation of the eccentric 50. The first nutating gear stage, which meshes in the angular position corresponding to 12 o'clock, leaves for example this position and moves toward 1 o'clock. Likewise, the second gear stage, which meshes in the six o'clock position, leaves this position and moves toward 7 o'clock.

The eccentric 50 can be manually or motor driven or driven in any other way. In the exemplary embodiment shown, the drive occurs so as to be suited for motorized adjustment. For this purpose, the eccentric 50 is integrally connected to a driver wheel 56 that is disposed axially relative to the eccentric 50 in a direction opposing the housing part 24 and/or the toothed surfaces. The driver wheel 56 is a worm wheel. It engages a worm 58. The rotational axis of said worm 58 is stationary relative to the housing part 24.

As best shown in FIG. 4, the gear train is of a quite short construction. The gear parts are located between the driver wheel 56 and the housing part 24. The corresponding axial dimension is substantially determined by the axial height of the toothed surfaces and by the axial dimension of the eccentric 50. It is possible to dispose the eccentric on the same plane as the toothed surfaces. The two exemplary embodiments according to the FIGS. 5 and 6 go along these lines.

Figure 5:
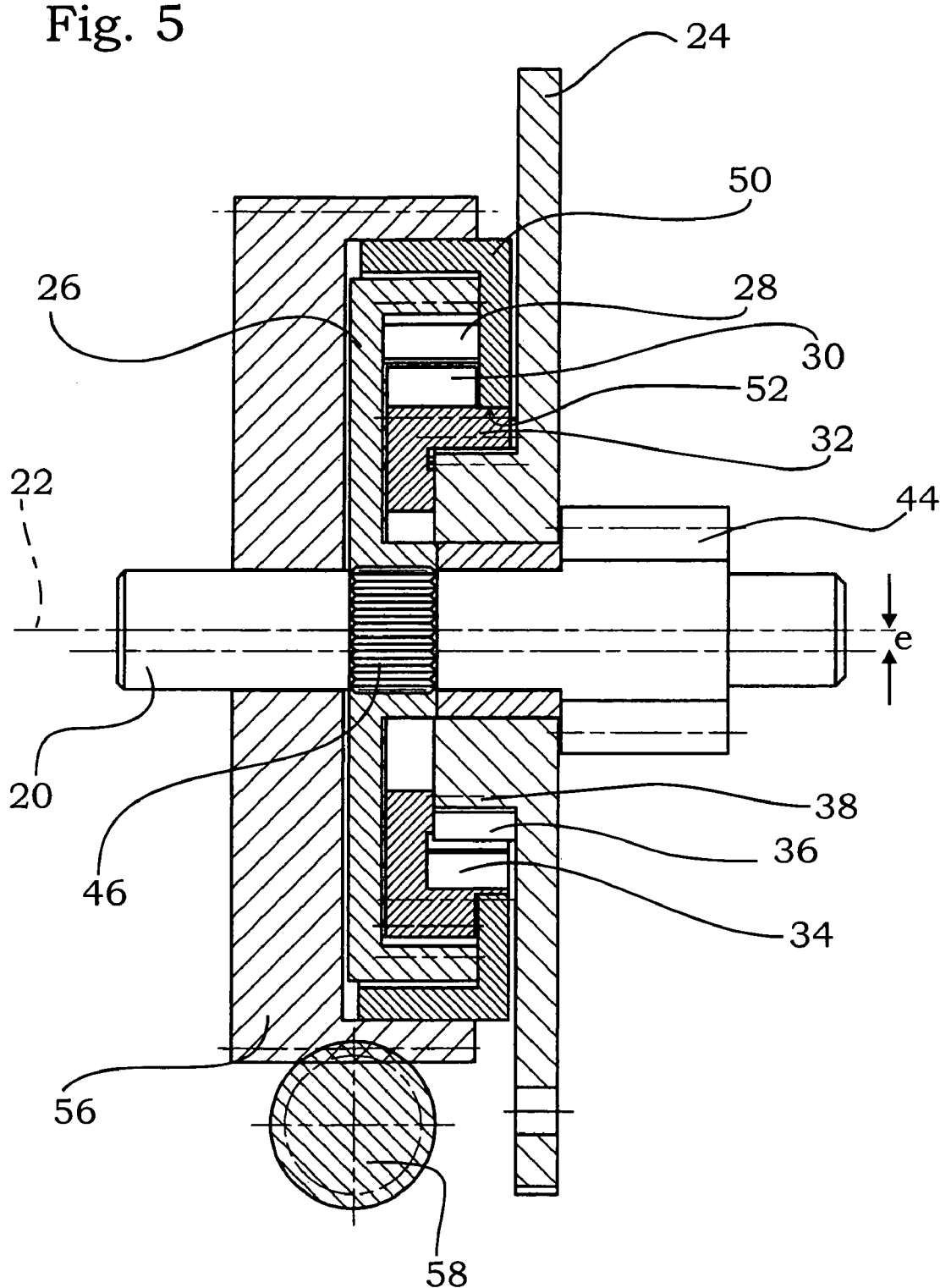
FIG. 5: is an axial sectional view of a gear train similar to that in FIG. 4 in a second embodiment

In the exemplary embodiment according to FIG. 5, it is not the toothed washer 26 that is associated with the housing part 24, here it is rather the gearwheel 38 that is formed by the housing part 24. As a result, only the toothed washer 26 and the gearwheel 38 substantially interchange their functions. Now, it is the toothed washer 26 that is non-rotatably linked to the output shaft 26 for which purpose the driver surface 48 is now provided on the toothed washer 26.

With this embodiment as well, the interaction between the driving surface 52 of the eccentric 50 and the associated driven surface 54 on the annular gear 32 now occurs in the reverse direction. The driven surface 54 now is a surface formed on the outer periphery of the annular gear 32 with the driving surface 52 accordingly being a surface opposing the output shaft 20.

Figure 6:
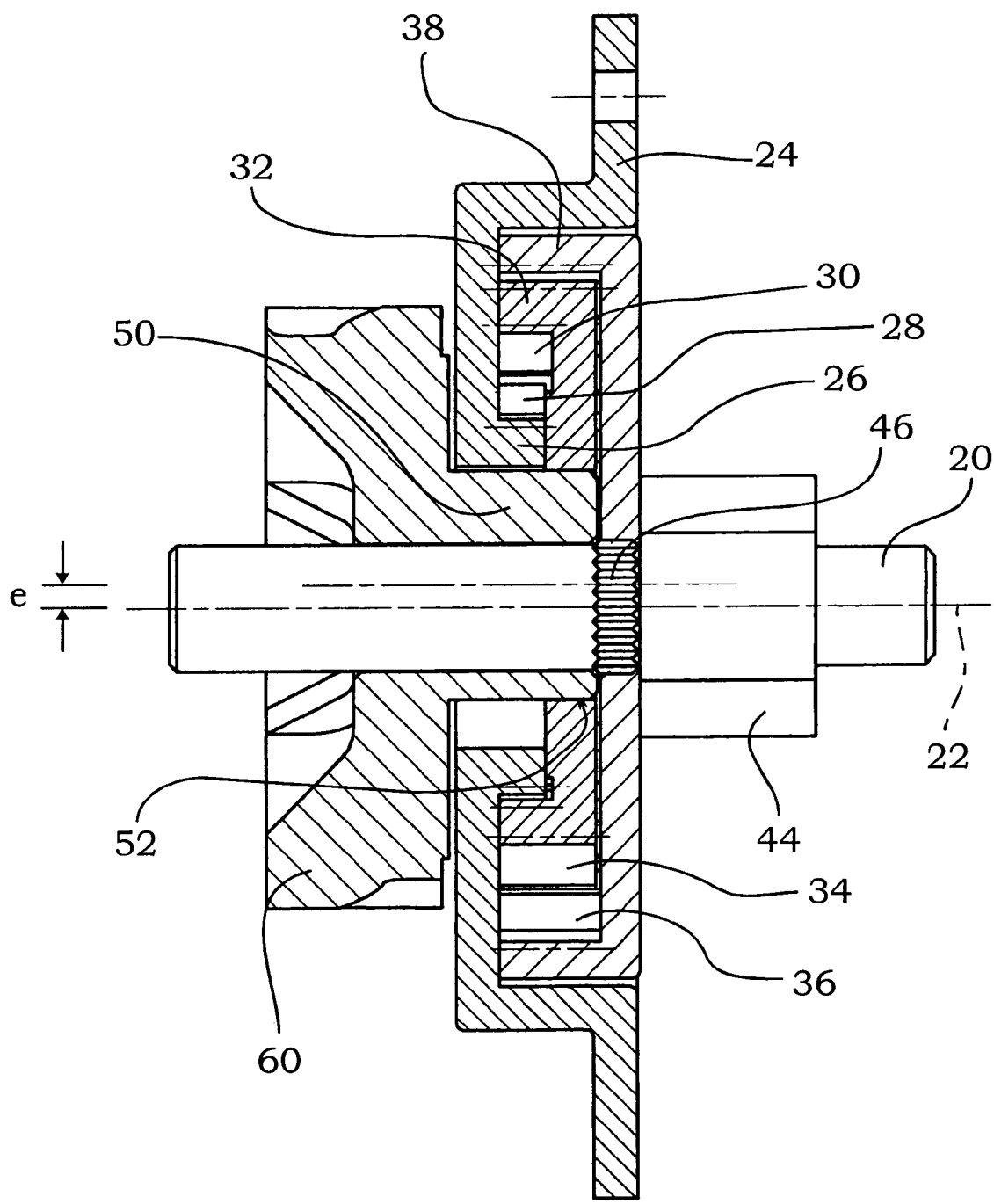
FIG. 6 is an axial sectional view of a gear train in a third embodiment and similar to FIG. 4, the drive being now configured as a handwheel.

The embodiment according to FIG. 6 differs in an important aspect from the previous exemplary embodiments: the eccentric 50 is now driven by a handwheel 60. No gear train is interposed, the eccentric is driven directly. Like in the first exemplary embodiment, the driving surface 52 of the eccentric 50 is a surface that lies radially outside. Accordingly, the driven surface 54 of the annular gear 32 is a radially internal surface. In this exemplary embodiment, the two toothed surfaces 30 and 34 of the annular gear 32 have the same number of teeth. The first toothed surface 28, which in turn is integrally associated with the housing part 24, also has the same number of teeth. As a result, gear reduction only occurs in the second nutating gear stage, the third toothed surface 34 and the fourth toothed surface 36 having only a one-tooth difference. The handwheel 60 is carried so as to be rotatable about the output shaft 20. A benefit of the construction becomes apparent here. It is possible to configure the output shaft 20 so as to be continuous and to moreover mount important parts of the gear train thereon. As a result, both these parts and the output shaft 20 are supported. Another benefit is that it is possible to provide connection to another seat side on which a similar gear train can be disposed.

The invention claimed is:

1. A step down gear train, for an adjusting device of an automotive vehicle seat, comprising: an output shaft that rotates about an output axis, a housing that is rotatable relative to the output shaft, a toothed washer having a circumferential first toothed surface, an eccentric that is rotatably disposed on said output shaft and has an eccentric driving surface which is offset relative to the output axis by an eccentricity, the eccentric comprising a driving region, an annular gear comprising a circumferential second toothed surface, a circumferential third toothed surface and an eccentric driven surface cooperating with the driving surface, a gearwheel comprising a circumferential fourth toothed surface, said first toothed surface of the toothed washer and said second toothed surface of the annular gear meshing together in a first angular position and forming a first nutating gear having the eccentricity and the third toothed surface of the annular gear and the fourth toothed surface of the gearwheel meshing together in a second angular position that is offset by 180 degrees relative to the first angular position with respect to the output axis and forming a second nutating gear also having the eccentricity, wherein there is provided a driver member that is connected to the ouput shaft and a driver surface that is formed in the gearwheel and configured to cooperate with said driver member and configured to provide a non-rotatable, releasable connection between the driver member and the gearwheel.

2. The step down gear train according to claim 1, wherein the second toothed surface of the annular gear is an externally-toothed surface and the third toothed surface of the annular gear is an internally-toothed surface or, conversely, the second toothed surface of the annular gear is an internally-toothed surface and the third toothed surface of the annular gear is an externally-toothed surface.

3. The step down gear train according to claim 1, wherein the housing has a housing part and the housing part forms either the toothed washer or the gearwheel.

4. The step down gear train according to claim 1, wherein the gearwheel comprises a bearing shoulder and the housing comprises a housing part that forms a bearing hole for said bearing shoulder.

5. The step down gear train according to claim 1, wherein the driving region of the eccentric is configured to be a worm wheel and there is provided a worm that meshes with said worm wheel.

6. The step down gear train according to claim 1, wherein the driving region is configured to be a handwheel.

7. The step down gear train according to claim 1, wherein the first through fourth toothed surfaces lie in one common radial plane.

8. The step down gear train according to claim 1 wherein there is provided a pinion that is connected.

9. The step down gear train according to claim 1, wherein the eccentric driving surface of the eccentric is located, as viewed in an axial direction, in immediate proximity to the second toothed surface and to the third toothed surface of the annular.

10. The step down gear train according to claim 1, wherein either the two toothed surfaces of the first nutating gear or the two toothed surfaces of the second nutating gear have a same number of teeth.

11. The step down gear train according to claim 1, wherein the second toothed surface and the third toothed surface are configured differently.

12. The step down gear train according to claim 1, wherein the first toothed surface and the second toothed surface are geometrically matched together and have involute form gear teeth.

13. The step down gear train according to claim 1, wherein the third toothed surface and the fourth toothed surface are geometrically matched together and have involute form gear teeth.

14. The step down gear train according to claim 1, wherein the second and third toothed surfaces differ by at most one tooth.

15. The step down gear train according to claim 1, wherein the first and fourth toothed surfaces differ by at most two teeth.

* * * * *